(12) United States Patent
Dunn et al.

(10) Patent No.: US 10,067,848 B2
(45) Date of Patent: Sep. 4, 2018

(54) METHODS AND SYSTEMS FOR BENCHMARKING WEB BROWSER PERFORMANCE

(71) Applicant: Facebook, Inc., Menlo Park, CA (US)

(72) Inventors: Jeffrey Scott Dunn, Seattle, WA (US); Joel F. Beales, Seattle, WA (US); Alexander Juarez, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 232 days.

(21) Appl. No.: 15/220,582

(22) Filed: Jul. 27, 2016

(65) Prior Publication Data

US 2018/0034721 A1 Feb. 1, 2018

(51) Int. Cl.
*G06F 11/34* (2006.01)
*G06F 17/30* (2006.01)
*H04L 29/08* (2006.01)

(52) U.S. Cl.
CPC ...... *G06F 11/3414* (2013.01); *G06F 11/3428* (2013.01); *G06F 17/30902* (2013.01); *H04L 67/02* (2013.01); *H04L 67/2857* (2013.01)

(58) Field of Classification Search
None
See application file for complete search history.

(56) References Cited

U.S. PATENT DOCUMENTS

| | | | | |
|---|---|---|---|---|
| 6,754,612 B1 * | 6/2004 | Vanfladern | .......... | G06F 11/3428 702/186 |
| 7,546,598 B2 * | 6/2009 | Blumenthal | ........ | G06F 11/3428 714/38.14 |
| 7,805,706 B1 * | 9/2010 | Ly | .......... | G06F 9/5083 709/221 |
| 8,127,032 B2 * | 2/2012 | Branson | ................ | G06F 9/5066 709/203 |
| 8,495,584 B2 * | 7/2013 | Beaty | .................. | G06F 11/3414 717/127 |
| 9,009,676 B2 * | 4/2015 | Chua | ................... | G06F 11/3414 717/127 |
| 9,064,038 B2 * | 6/2015 | Brown | ................ | G06F 11/3428 |
| 9,229,846 B1 * | 1/2016 | Budhai | ................ | G06F 11/3624 |
| 9,740,595 B2 * | 8/2017 | Enright | ............... | G06F 11/3684 |
| 2005/0216479 A1 * | 9/2005 | Wefers | ................... | G06Q 10/06 |
| 2010/0251031 A1 * | 9/2010 | Nieh | .................... | G06F 11/3419 714/45 |
| 2014/0129697 A1 * | 5/2014 | Tuovinen | ............... | H04L 43/106 709/224 |
| 2017/0075738 A1 * | 3/2017 | Han | ........................ | H04L 29/06 |

* cited by examiner

*Primary Examiner* — Thomas J Dailey
(74) *Attorney, Agent, or Firm* — FisherBroyles, LLP (57) ABSTRACT

The disclosure is directed to a benchmarking system for measuring performance of a client-side application, e.g., a web browser, in processing an application, e.g., rendering a web page of a social networking application. The benchmarking process is executed in multiple modes, e.g., a record mode and a replay mode. In the record mode, the benchmarking system warms up a proxy server by storing request-response pairs between a client device and an app server in a cache of the proxy server. In the replay mode, the benchmarking system replays the requests to obtain the responses from the cache of the proxy server and records various metrics that indicate a performance of the client-side application in processing the responses, e.g., rendering the web page.

20 Claims, 6 Drawing Sheets

METHODS AND SYSTEMS FOR BENCHMARKING WEB BROWSER PERFORMANCE

BACKGROUND

Benchmarking is a process for assessing the relative performance of a computer system by running a number of tests against it. Benchmarking is usually associated with assessing performance characteristics of computer hardware, for example, a CPU, and computer software. Software benchmarks are, for example, run against compilers or database management systems. Benchmarks provide a method of comparing the performance of various subsystems across different chip/system architectures. Browser benchmarking is a process for measuring a performance of a client-side application, e.g., a web browser. The browser performance in processing an application can depend on various factors, including server-side performance of the application and client-side performance of the application. The server-side performance is performance of a server-side portion of the application executing at an application server computing device ("app server") and the client-side performance is performance of a client-side portion of the application executing in a client-side application, e.g., a web browser, at a client computing device ("client").

Some software benchmarking systems focus on the server-side performance of the application and benchmark the server-side performance. Not many software benchmarking systems focus on the browser performance. The software benchmarking systems that do focus on the browser benchmarking are inefficient. For example, the prior browser benchmarking systems do not isolate the effect of the server-side performance on the client-side performance. That is, the browser performance metrics that are determined are dependent on the server-side performance of the application. If the server-side performance changes, the browser performance metrics also change. Such measurements are therefore, not accurate. Further, prior browser benchmarking systems do not use real-world data to benchmark the browser performance. Such benchmarking techniques may not provide accurate performance results, and often, the performance of the browser in handling the real-world data in a production environment varies from, e.g., is inferior to, the performance determined by the benchmarking techniques.

Even if some of the prior browser benchmarking systems use real world data, some web pages are so dynamic that the content of the web page changes before a test case is repeated, and therefore, the metrics so generated do not often reflect accurate results. The prior browser benchmarking systems lack an efficient way to control data changes in the application during benchmarking process.

DETAILED DESCRIPTION

Embodiments are directed to a benchmarking system for measuring performance of a client-side application, e.g., a web browser, in processing an application, e.g., a social networking application. In some embodiments, measuring the client-side performance includes measuring the performance of the web browser in rendering a web page of the social networking application. The performance of the application can be determined as a function of server-side performance and the client-side performance. The server-side performance indicates a performance of server-side portion of the application executing at one or more application server computing devices ("app servers"), and the client-side performance indicates the performance of the client-side application in processing a client-side portion of the application, e.g., performance of a web browser in loading a web page of the social networking application. The benchmarking system provides a controlled environment for measuring the client-side performance in which the impact of the server-side performance on the client-side performance is minimized. For example, the benchmarking system makes use of a proxy server to minimize the impact of the server-side performance on the client-side performance. The benchmarking system is executed in multiple modes, e.g., a record mode and a replay mode, to measure the client-side performance. In the record mode, the benchmarking system is prepared for taking measurements of the client-side performance, and in the replay mode, the benchmarking system records various metrics that indicate the client-side performance.

In the record mode, a client-side application on a client computing device ("client device"), e.g., a web browser, is made to issue a number of requests to the application executing at an app server, e.g., via a uniform resource locator (URL). The app server generates the responses and returns them to the client device. During the record mode, the benchmarking system records, e.g., caches, all client requests and responses for those requests in the proxy server. The proxy server can be "warmed up" by storing several such request response pairs. During the record mode, when a request is received at the proxy server, the proxy server returns the response if the request is stored at the proxy server, else the request is forwarded to the app server for returning the response. When the response is returned from the app server, the response is stored in the proxy server and then returned to the client device. In some embodiments, the proxy server stores the request response pairs as key value pairs.

In the replay mode, the app server is disconnected and the requests from the client device are served by the proxy server instead of the app server. For example, the responses are returned from a cache of the proxy server. This means that a response is served instantaneously from the cache, thereby eliminating the app server time and resource that otherwise may be required for generating the response. If a response is not stored in the proxy server, an error message is returned to the client (the request is not forwarded to the webserver). By eliminating the role of the app server in generating the response, the impact of server-side performance on the client-side performance of the application is minimized. Any client-side performance metrics recorded in the replay mode provide a more accurate representation of the client-side performance than when recorded without eliminating the impact of the server-side performance of the application.

The benchmarking system records various client-side performance metrics, e.g., time to interact (TTI), display done (DD) time, and end to end (E2E) time. In some embodiments, TTI is the time taken by a client-side application to complete processing the client-side portion of the application such that an end user can start interacting with the application. For example, TTI can be the time taken by the web browser to render a news feed of a web page of the social networking application. In some embodiments, display done is the time taken by the client-side application to complete executing display portion of the application code for displaying the application at the client device. For example, display done is the time required to complete executing a display portion of the application code to the display the web page but not the post-display portion of the application code. In some embodiments, the application includes portions of code that is executed after the web page is displayed completely, e.g., code for logging data, code for initializing event handlers in the web page. The display done time does not include the time for executing the post-display portion of the application code. In some embodiments, the E2E time is the time taken by the client-side application to process the client-side portion of the code completely, e.g., until no further central processing unit (CPU) time is required for processing the client portion. For example, the E2E time includes the time required for rendering a web page of the social networking application completely, e.g., time required to display the page completely and loading all the post-display portion of the application code until no further CPU time is required.

In some embodiments, the benchmarking system can determine the client-side performance for multiple versions of the application. For example, a first version of the application can be deployed on a first app server and a second version of the application can be deployed on a second app server. The benchmarking system can issue separate requests to the app servers, e.g., in an alternate fashion, and "warm up" the proxy server with the requests and the responses from both the app servers. In the replay mode, the client-side performance of both the versions can be determined. Such testing can be used in a scenario where a developer would like to know how a specific revision to the application code performs before deploying the changed code in a production environment. Also, the benchmarking system can use a production version of the application as one of the versions so that the metrics so generated reflect the performance of the browser in handling the real-world data. For example, the first version of the application can be the production version and the second version can be a version in which a change, e.g., an enhancement, is made to the production version of the application code.

Figure 1:
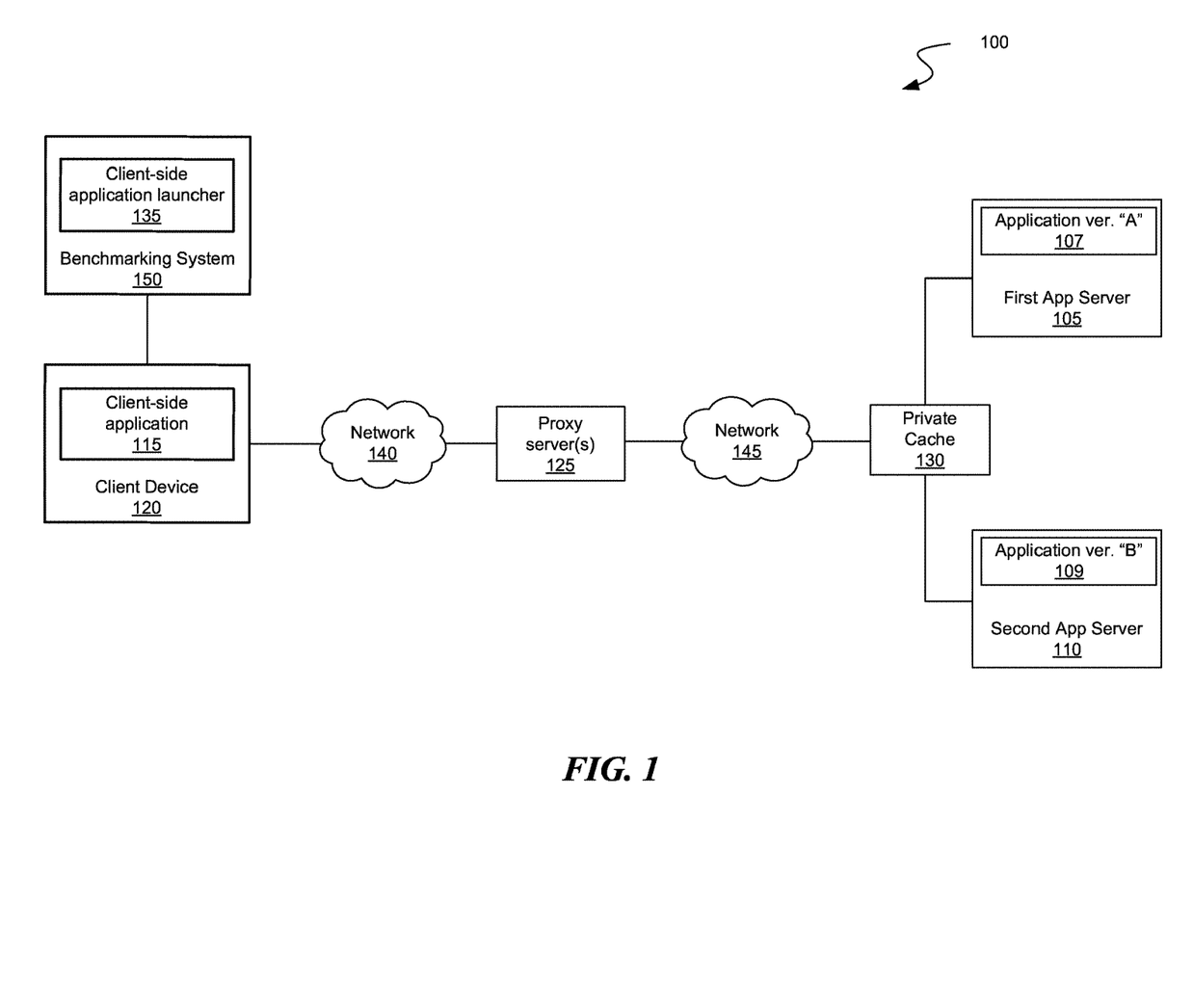
FIG. 1 is a block diagram of an environment in which the disclosed embodiments may be implemented.

Turning now to the figures, FIG. 1 is a block diagram of an environment 100 in which the disclosed embodiments may be implemented. The environment 100 includes a benchmarking system 150 that can be used to benchmark performance of a client-side application 115, e.g., a web browser, in processing an application, e.g., a web page of a social networking application. For example, the benchmarking system 150 can be used to benchmark performance of the client-side application 115 ("client-side performance") in rendering a webpage of the social networking application.

The client-side application 115 can reside at a client device 120. The client device 120 can be any computing device that is capable of the executing the client-side application 115, e.g., a desktop personal computer (PC), a laptop, a smartphone, a tablet PC, a wearable device.

The environment 100 can be implemented for testing the client-side performance for one or more versions of the application. In the FIG. 1, the environment 100 is implemented for "A/B testing" of the application. In some embodiments, "A/B testing" is comparing two versions, e.g., A and B, of an application to determine which one performs better. For example, A/B testing can be used to compare a performance of two versions of a web page at the same time. The environment 100 includes a first app server 105 and a second app server 110 on which a first version 107 of the application (version "A") and a second version 109 of the application (version "A") are deployed. While the environment 100 is illustrated with respect to A/B testing, the environment 100 can be adapted to benchmark the client-side performance for more or less number of versions of the application.

The benchmarking system 150 provides a controlled environment for benchmarking the client-side performance. For example, the benchmarking system 150 eliminates an effect of the server-side performance of the application on the client-side performance in the process of benchmarking. To do so, the benchmarking system 150 makes use of a proxy server 125 that caches request-response pairs between the client device 120 and the first app server 105 or the second app server 110. Once the proxy server 125 is warmed up with the multiple request-response pairs ("record mode"), the app servers 105 and 110 can be disconnected, and responses to the requests from the client device 120 can then be served from the proxy server 125 ("replay mode"), e.g., from the cache of the proxy server 125, thereby eliminating any processing time required by the app servers in generating the responses. The client device 120 can communicate with the proxy server via a communication network 140, e.g., Internet, Intranet, Local Area Network (LAN), and Wide Area Network (WAN).

The benchmarking process involves executing the benchmarking system 150 in one or more phases/modes, e.g., a record mode and a replay mode, to benchmark the client-side performance. In the record mode, the benchmarking system 150 is prepared for recording various metrics of the client-side performance, e.g., warmup the proxy server 125, and in the replay mode, the benchmarking system 150 records the various metrics.

In the record mode, the benchmarking system 150 instructs a client-side application launcher 135 to issue a number of requests to the application at the first app server 105 and the second app server 110 server. For example, the client-side application launcher 135 opens multiple instances of a web browser on the client device 120 and generates various requests, e.g., via URLs, to the application at the first app server 105 and the second app server 110. In some embodiments, the client-side application 115 issues separate requests (for the same web page) to the first app server 105 and the second app server 110. The app servers generate the responses and return them to the client device 120. For example, the first version of the application 107 generates a response including a first version of a webpage, and the second version of the application 109 generates a response including a second version of the same webpage. All client requests and responses for those requests are stored in the proxy server 125. In some embodiments, one of the purposes of the record phase is to "warm up" the proxy server 125, e.g., store several request-response pairs.

Further, the app servers are executed in a "shimming mode" to record some of the responses in a shared private cache 130 that is shared between the first app server 105 and the second app server 110. As described above, two separate requests are issued for a web page, e.g., a first request to the first app server 105 and a second request to the second app server 110. So, since the requests are directed to two different app servers, there's a possibility of data changes that cause the content of the web page to change between the app servers. In a shimming mode, a request to any app server passes through the private cache 130. A lookup is performed in the private cache 130 to determine if the private cache 130 has stored the request. If the private cache 130 has stored the request, the response to the request is retrieved from the private cache 130 and returned to the client device 120. If the request is not stored in the private cache 130, the request is forwarded to the corresponding app server, which generates and returns the response. The response is stored in the private cache 130 before being returned to the client device 120. So, later when the same request is issued again, the response will already have been stored in the private cache 130, so the response is returned from the private cache 130 rather than requesting the app server, thereby ensuring that the same webpage is returned for the two separate requests to the app servers. Accordingly, the shimming mode helps in controlling the data changes in the web page. The request-response pairs may be stored as key-value pairs in the private cache 130. In some embodiments, the app servers are executed in the shimming mode during the recording phase. The proxy server 125 can communicate with the private cache 130 and/or the app servers via a communication network 145, e.g., Internet, Intranet, LAN, and WAN.

After the record phase completes, various request-responses will be stored in the proxy server 125. In the replay mode, the app servers are disconnected, and the requests from the client device 120 are served by the proxy server 125 instead of the app servers. This means that a response is served instantaneously from the cache of the proxy server 125, thereby eliminating the app server time and resource that otherwise may be required for generating the response. If a response is not stored in the proxy server, an error message is returned to the client (the request is not forwarded to the webserver). By eliminating the role of the app servers in generating the response, the impact of server-side performance of on the client-side performance is minimized. Any client-side performance metrics recorded in the replay mode provide a more accurate representation of the client-side performance than when recorded without eliminating the impact of the server-side performance of the application. Some of the metrics of the client-side performance recorded include TTI, DD time, and E2E time. In some embodiments, a code of the application ("application code") may be instrumented to record various metrics.

In some embodiments, at least a portion of the application code may be non-deterministic. For example, the application code can include non-deterministic code such as random function, date and/or time function, which can change the execution path of the application code every time it is executed. So, the application code can execute in a first path during record mode and in a second path during replay mode result in generating different responses for the same request, or even generate the same request with different values for its parameters (if the parameters are based on non-deterministic functions) at different times. Further, one or more of the server-side portion of the application code or the client-side portion of the application code can be non-deterministic. In order to avoid the above problem, the benchmarking system 150 may require the application code to be modified to make the application code deterministic. The application code can be made deterministic in multiple ways. Additional details with respect to benchmarking the client-side performance are described with reference to the FIGS. 2-5 and the following paragraphs.

Figure 2:
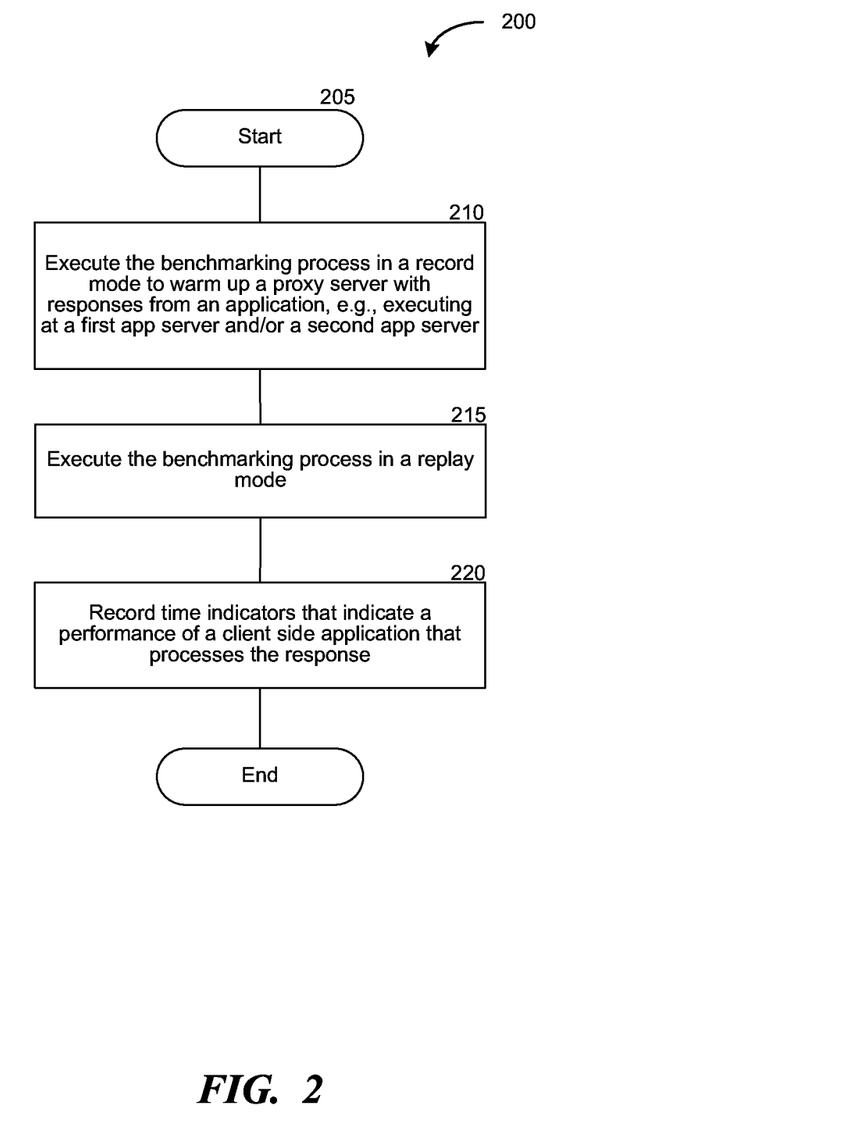
FIG. 2 is a flow diagram of a process of benchmarking client-side performance, consistent with various embodiments.

FIG. 2 is a flow diagram of a process 200 of benchmarking client-side performance, consistent with various embodiments. In some embodiments, the process 200 may be implemented in the environment 100 of FIG. 1. The process 200 begins at block 205, and at block 210, the benchmarking system 150 executes the benchmarking process in a record mode. The app servers execute A/B versions of the application code at a first app server and a second app server, respectively. In some embodiments, the "A" version or the first version 107 of the application can be a production version of the application, e.g., application that is "live" and used by users in the real-world, and the "B" version can be a revised version of the production application code that needs to be tested, e.g., for client-side performance, before it is released to production.

In the record mode, the benchmarking system 150 issues requests to both the app servers, collects the responses for those requests, and warms up the proxy server 125 by storing all the request-response pairs in a cache of the proxy server 125. The application code is tested for various test case scenarios and each test case scenario can include issuing separate requests to the application at the first app server 105 and the second app server 110, and obtaining the responses from the app servers. A particular test case scenario can be executed at both the app servers. For example, a client-side application launcher 135 issues a request to the first app server 105, records the request-response in the proxy server 125, then issues the same request (but URL may be different since the address of the servers are different) to the second app server 110. The request-response pair associated with the second app server 110 is stored in the proxy server 125. Various such test case scenarios are executed and the proxy server is warmed up with the request-response pairs.

Referring back to the process, after the proxy server 125 is warmed up, at block 215, the benchmarking system 150 executes the benchmarking process in a replay mode. In the replay mode, the app servers are disconnected, e.g., made unavailable, and the requests that were issued to the app servers during the record phase are issued again. The responses are now received from the proxy server 125 instead of the app servers, thereby isolating the impact of the server-side performance on the client-side performance. For each request received at the proxy server 125, the proxy server 125 determines if the received request is stored in its cache (not illustrated), and if the request is stored, the proxy server 125 retrieves the response and returns it to the client device 120. If the request is not stored in the proxy server 125, an error message is generated, such as "Page not found."

At block 220, the client-side application 115 records multiple time indicators containing metrics that indicate a performance of the client-side application 115 in processing the response, e.g., in rendering the web page. In some embodiments, the time indicators include a TTI indicator, which is the time taken by the client-side application 115 to complete processing the client-side portion of the application code such that an end user can start interacting with the application. For example, TTI can be the time taken by the web browser to render a news feed of a web page of the social networking application. In some embodiments, the time indicators include a DD time indicator, which is the time taken by the client-side application to complete executing display portion of the application code for displaying the application at the client device. For example, display done is the time required to complete executing a display portion of the application code to the display the web page but not the post-display portion of the application code. In some embodiments, the application includes portions of code that is executed after the web page is displayed completely, e.g., code for logging data, code for initializing event handlers in the web page. The DD time may not include the time for executing the post-display portion of the application code. In some embodiments, the time indicators include an E2E time indicator, which indicates the time taken by the client-side application 115 to process the client-side portion of the application code completely, e.g., until no further CPU time is required for processing the client portion. For example, the E2E time includes the time required for rendering a web page of the social networking application completely, e.g., time required to display the page completely and loading all the post-display portion of the application code until no further CPU time is required.

In some embodiments, the client-side portion of the application code can be instrumented to record various such time indicators. Further, the client-side application, that is, the web browser can also record various metrics that indicate the performance of the web browser in rendering the web page. For example, the web browser can record time indicators that indicate the time spent by the web browser in processing various portions, sections or tasks of the application code, such as time spent running JavaScript code, time spent parsing JavaScript code, time spent compiling the JavaScript code, time spent rendering the page. Such data can be aggregated across different trials and used for generating various analytics that can help an application developer to debug the application code accordingly. Further, the above metrics can be collected for both the versions of the application code and then compared with each other for analyzing, debugging and/or fine-tuning one or the other version of the application code accordingly. The process 200 returns after the time indicators are recorded.

In some embodiments, some portions of the application code can be non-deterministic. Accordingly, in order to ensure that the same response is generated for a request every time the request is issued, the application code may have to be modified to make the application code deterministic. Further, the application code has to be made deterministic prior to executing the benchmarking process in the record mode. For example, the application code can include non-deterministic code such as a random function, a date and/or time function, based on the output of which some portion of the application code can execute. Since the output of such functions is non-deterministic, the execution path of the application code can change every time it is executed. The application code has to be made deterministic in order to avoid such situations.

The application code can be made deterministic in multiple ways. For example, the random function be replaced with a customized random function, e.g., a "seed" based random function, so that the customized random function generates the same sequence of numbers for multiple runs. In some embodiments, a seed is an integer used to set the starting point for generating a series of random numbers. The seed can set the random number generator to a random starting point. For example, if a seed is set to number "5", and the application code executes the random function three times, the sequence of random numbers generated can be "5, 8, 8." When the application code is executed again, the seed-based random generator generates the same sequence of numbers—"5, 8, 8."

Further, the ways in which a client-side portion of the application code is made deterministic can be different from that of the server-side portions of the application. In some embodiments, the client-side portion of the code, e.g., JavaScript, is single threaded and therefore, a sequence in which the function calls are made in the client-side portion of the code for a specific test case, may be same for every run of the specific test case. For example, if the calls to a random function are made in a particular sequence in a first run of the test case, the calls may be made in the same sequence for a second run of the test case and so on. So, customizing the random function with a seed can make the random function deterministic. However, with respect to the server-side portion of the application code, the server-side portion can be a multi-threaded code, which means multiple threads can make calls to the random function, and therefore, the sequence in which the calls are made to the random function can be different or unpredictable for different runs of the test case. So to overcome the above problem, the application code on the server-side is modified to generate a unique sequence of random numbers for each of the multiple threads. This can be accomplished by generating a stack trace for every call of the random function, which enables identification of the thread calling the random function and for each unique stack trace a unique sequence of random numbers is generated, e.g., each thread will have its own seed-based random function having a unique seed which generates a unique sequence of random numbers. That is, the seed used for a random function is unique to a specific thread and therefore, the sequence of random numbers generated for each calling thread is unique to that thread.

Another non-deterministic function is the date function. The date function is replaced with a customized date function that is deterministic. For example, the date function can be modified to increment by a specified number consistently for every call. Other non-deterministic functions can be made deterministic similarly.

Figure 3:
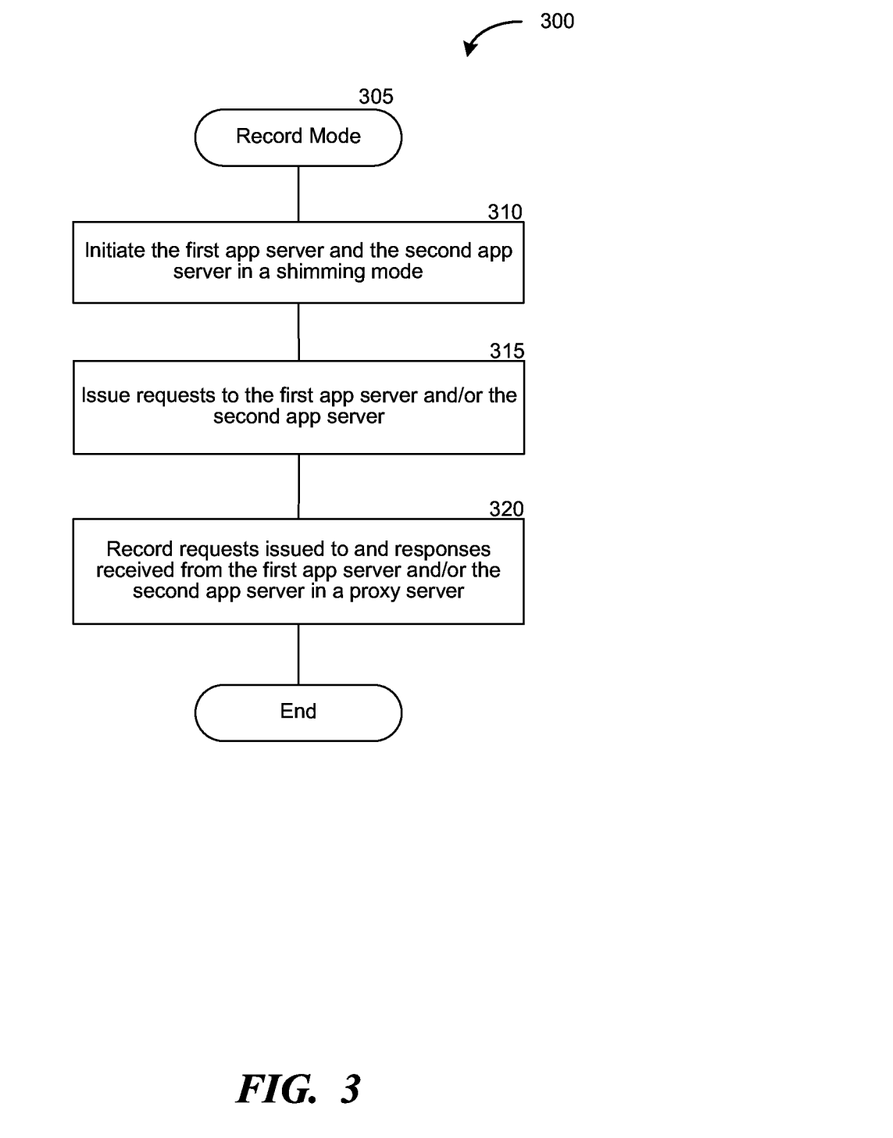
FIG. 3 is a flow diagram of a process for executing a benchmarking process in a record mode, consistent with various embodiments.

FIG. 3 is a flow diagram of a process 300 for executing the benchmarking process in a record mode, consistent with various embodiments. In some embodiments, the process 300 may be implemented in the environment 100 of FIG. 1, and as part of block 210 of process 200. A user, e.g., a tester, may have to ensure that the application code does not contain non-deterministic code prior to executing the benchmarking process in the record mode. The process 300 begins at block 305, and at block 310, the benchmarking system 150 initiates the first app server 105 and the second app server 110 in a shimming mode. In the shimming mode, any requests issued to the app servers are configured to pass through the shared private cache 130. If a request is stored in the private cache 130, the response is retrieved from the private cache 130 and returned to the client device 120, else the request is passed to the corresponding app server for generating a response.

At block 315, the benchmarking system 150 issues requests to both the app servers. The application code is tested for various test case scenarios and each test case scenario can include issuing separate requests to the application at the first app server 105 and the second app server 110, and obtaining the responses from the app servers. In some embodiments, the benchmarking system 150 generates the requests using the client-side application launcher 135, e.g., WebDriver, which is a tool for automating web application testing. The client-side application launcher 135 can make direct calls to the client-side application 115, e.g., a web browser, and generate a request to the application using the web browser via an URL. The client-side application launcher 135 can launch multiple instances of the web browser for issuing multiple requests. A particular test case scenario can be executed at both the app servers. For example, the client-side application launcher 135 can issue a request corresponding to the particular test case scenario to the first app server 105 to receive a response from the first app server 105 and issue the same request (but URL may be different since the address of the two servers is different) to the second app server 110 to receive a response from the second app server 110. The client-side application launcher 135 can generate the requests for the app servers separately, e.g., in an alternate fashion. The responses received from the app servers are forwarded to the client-side application 115 for processing, e.g., rendering the web page. However, no time indicators are recorded during the record phase, or even if they are recorded, they may not be as accurate as the ones recorded during the replay mode.

At block 320, the proxy server 125 stores each of the requests issued to the first app server 105 or the second app server 110 and the corresponding response in a cache of the proxy server 125. Multiple such test case scenarios are executed and the proxy server 125 is warmed up with the corresponding request-response pairs. The proxy server 125 can store the request-response pairs as key-value pairs. For example, a request can be stored as a key and a response to the request can be stored as the value of the key. In some embodiments, a hash value is computed for the request object and the hash value is stored as the key. If any of the request parameters include non-deterministic parameters, they are converted to deterministic parameters, e.g., using the methods described above, before the hash value is computed.

Figure 4:
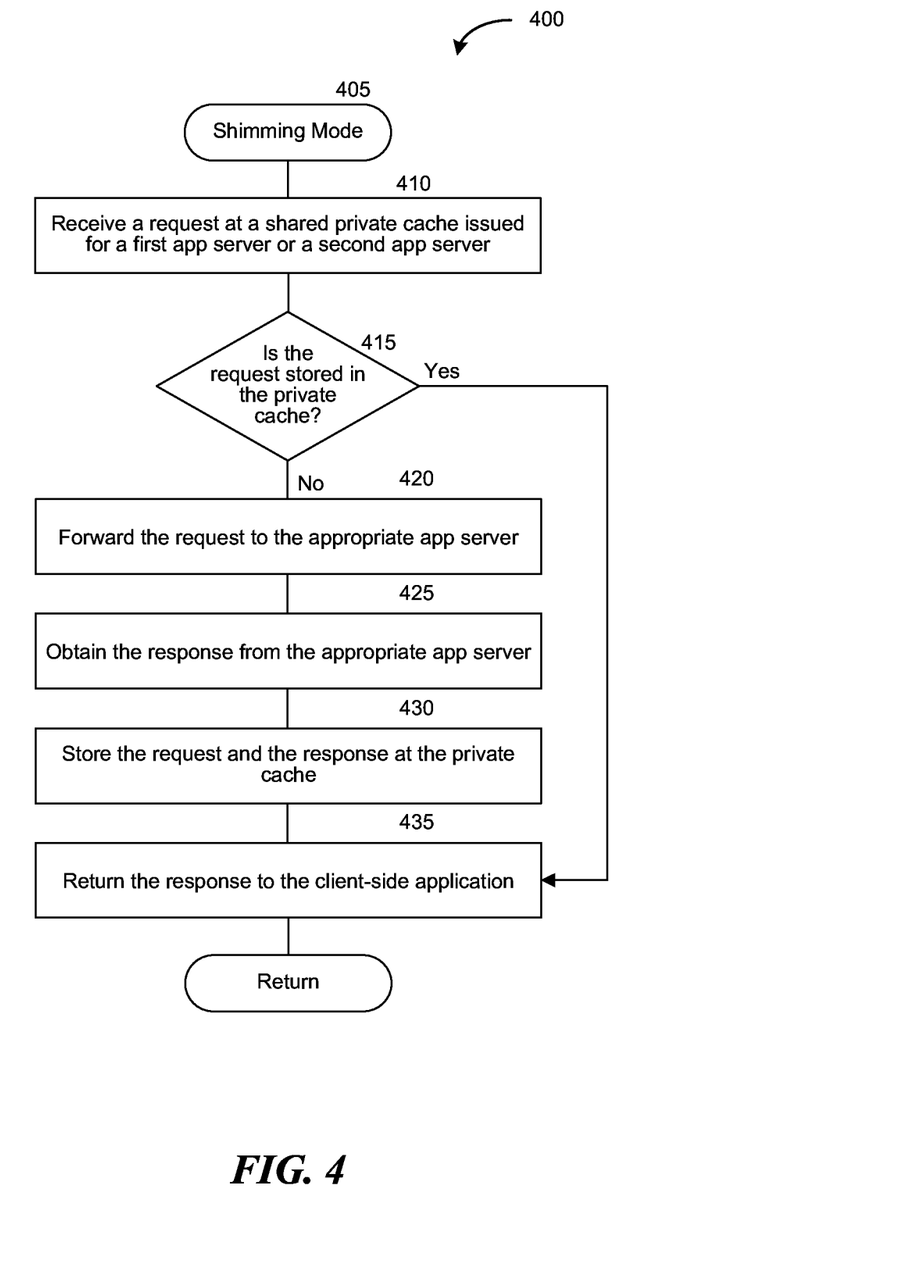
FIG. 4 is a flow diagram of a process for initiating application server computing devices ("app servers") in a shimming mode, consistent with various embodiments.

FIG. 4 is a flow diagram of a process 400 for initiating the app servers in a shimming mode, consistent with various embodiments. The process 400 may be implemented using the environment 100 of FIG. 1, and can be executed as part of block 310 of process 300 of FIG. 3. As described above, two separate requests are issued for obtaining a web page, e.g., one request to the first app server 105 for obtaining a first version of the web page and another request to the second app server 110 for obtaining a second version of the web page. So, since the requests are directed to two different app servers, there's a possibility that content of the web page can change after the first version of the webpage is obtained but before the second version is obtained and the two webpages can have different content. The shimming mode is implemented to avoid such a situation and to ensure data consistency. In a shimming mode, a request to any app server passes through the private cache 130. If the private cache 130 has a response to the request, the response is sent from the private cache 130. If the response is not stored in the private cache 130, then the request is forwarded to the corresponding app server, which generates and returns the response. The response is stored in the private cache 130 before being returned to the client device 120. So, later when the same request is issued again, the response will already have been stored in the private cache 130, so the response is returned from the private cache 130 rather than requesting the app server, thereby ensuring that the same webpage is returned for the two separate requests to the app servers.

The process 400 begins at block 405, and at block 410, the private cache 130 receives a request issued to the first app server 105 or the second app server 110 by the benchmarking process in the recording mode. At determination block 415, the private cache 130 performs a lookup to determine if the request is stored in the private cache 130. Responsive to a determination that the request is stored in the private cache 130, at block 435, the private cache 130 retrieves the response, e.g., the web page, to the request and returns it to the client device 120.

On the other hand, if the private cache 130 does not contain the request, at block 420, the private cache 130 forwards the request to the corresponding app server. For example, if the benchmarking system 150 issued the request to the first app server 105, the request is routed to the first app server 105.

At block 425, the app server, e.g., the first app server 105 or the second app server 110, generates the response for the request. The private cache 130 obtains the response from the app server.

At block 430, the private cache 130 stores the request and the response, e.g., as a key-value pair.

At block 435, the private cache 130 returns the response to the client device 120 for processing by the client-side application 115, and the process 400 returns.

Figure 5:
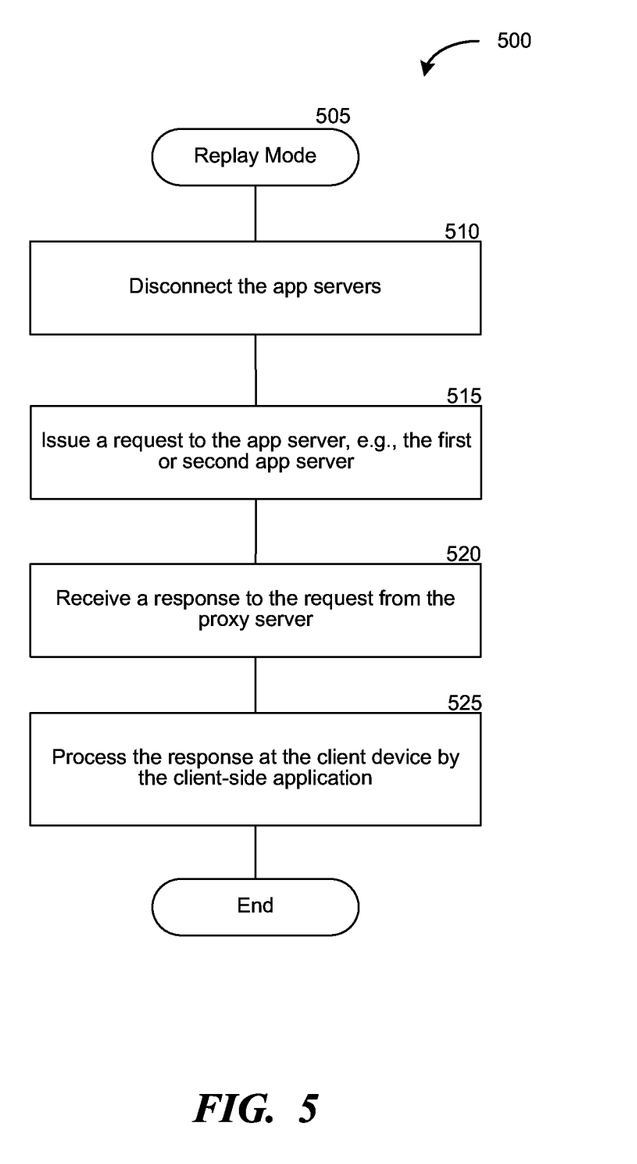
FIG. 5 is a flow diagram of a process for executing the benchmarking process in a replay mode, consistent with various embodiments.

FIG. 5 is a flow diagram of a process 500 for executing the benchmarking process in a replay mode, consistent with various embodiments. The process 500 can be implemented in the environment 100 of FIG. 1, and can be executed as part of block 215 of process 200 of FIG. 2. The process 500 starts at block 505, and at block 510, the benchmarking system 150 disconnects the app servers, e.g., makes the app servers unavailable. In some embodiments, the app servers can be made unavailable by disabling the communication link between the proxy server 125 and the communication network 145. In some embodiments, the app servers can be made unavailable by shutting down the app servers.

At block 515, the benchmarking system 150 issues a request to the app server, e.g., the first app server 105 or the second app server 110.

Since the app servers are disconnected, the proxy server 125 processes the request. At block 520, the client-side application 115 receives the response to the request from the proxy server 125. In some embodiments, when the proxy server 125 receives the request, the proxy server 125 performs a cache look up to determine whether the request is stored in its cache. If the request is stored in the proxy server 125, the proxy server 125 retrieves the response and sends it to the client device for processing by the client-side application 115. If the proxy server 125 does not have the request, the proxy server 125 generates an error message, e.g., "Page Not Found," and sends the error message as the response.

At block 525, the client-side application 115 processes the received response, e.g., renders the web page, and the process 500 returns.

Figure 6:
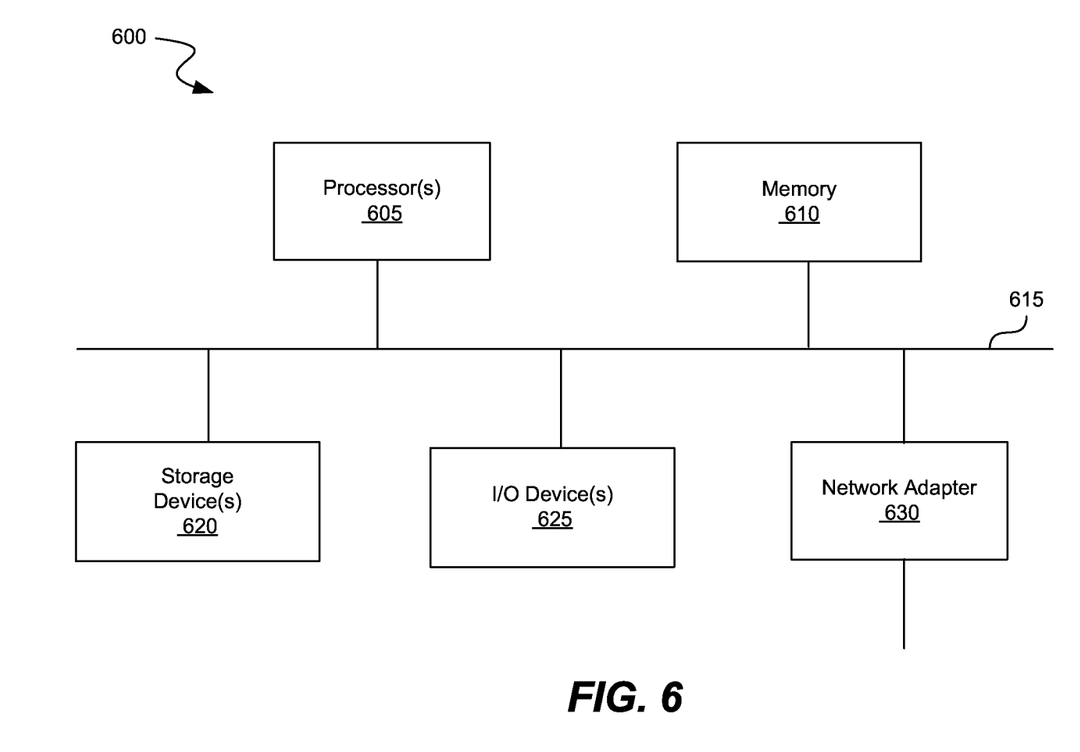
FIG. 6 is a block diagram of a processing system that can implement operations, consistent with various embodiments.

FIG. 6 is a block diagram of a computer system as may be used to implement features of the disclosed embodiments. The computing system 600 may be used to implement any of the entities, components, modules, systems, or services depicted in the examples of the foregoing figures (and any other entities described in this specification). The computing system 600 may include one or more central processing units ("processors") 605, memory 610, input/output devices 625 (e.g., keyboard and pointing devices, display devices), storage devices 620 (e.g., disk drives), and network adapters 630 (e.g., network interfaces) that are connected to an interconnect 615. The interconnect 615 is illustrated as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 610 and storage devices 620 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media).

The instructions stored in memory 610 can be implemented as software and/or firmware to program the processor(s) 605 to carry out actions described above. In some embodiments, such software or firmware may be initially provided to the processing system 600 by downloading it from a remote system through the computing system 600 (e.g., via network adapter 630).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a specified feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method, comprising:

executing a first version of an application deployed at a first server and a second version of the application deployed at a second server in a record mode to record multiple responses of the first and second versions of the application corresponding to multiple requests, wherein some of the multiple responses originate from the first version of the application deployed on the first server and some of the multiple responses originate from the second version of the application deployed on the second server, and wherein the multiple responses and the multiple requests are recorded at a proxy server that acts as a proxy to both the first server and the second server, wherein the executing further includes:

initiating the first server and the second server in a shimming mode to record the multiple responses and the multiple requests in a private cache that is shared between the first server and the second server;

executing the application in a replay mode to obtain the multiple responses for the corresponding multiple requests from the proxy server, wherein the replay mode eliminates a variance of the performance of the first server and the second server in measuring the performance of a client application that is processing the multiple responses; and recording, during the replay mode and for each of the multiple responses, multiple time indicators that indicate a performance of the client application for performing multiple functions of the application.

2. The computer-implemented method of claim 1, wherein recording the multiple time indicators includes recording a first time indicator that indicates an amount of time taken by the client application to render a first portion of a webpage of the application at a client device.

3. The computer-implemented method of claim 2, wherein loading the first portion of the webpage includes loading a news feed of a social networking webpage.

4. The computer-implemented method of claim 1, wherein recording the multiple time indicators includes recording a second time indicator that indicates an amount of time taken by the client application to render an entire webpage of the application at a client device.

5. The computer-implemented method of claim 1, wherein recording the multiple time indicators includes recording a third time indicator that indicates an amount of time taken by the client application to render an entire webpage of the application at a client device and load post-rendering client-side code in the webpage.

6. The computer-implemented method of claim 1, wherein executing the application in the record mode includes modifying the first version and the second version of the application to make application code to be deterministic.

7. The computer-implemented method of claim 6, wherein modifying the application code to be deterministic includes replacing a random function in a client-side portion of the application code with a random function that is customized based on a seed to generate the same set of values when the random function is invoked in each of the multiple requests.

8. The computer-implemented method of claim 6, wherein modifying the application code to be deterministic includes: replacing a random function in a server-side portion of the application code with a customized random function that is customized based on a seed, and which, when invoked by the server-side portion, generates a stack trace, the stack trace including a unique sequence of values generated by the customized random function.

9. The computer-implemented method of claim 6, wherein modifying the application code to be deterministic includes replacing a date function in a client-side portion of the application with a customized date function that increments the date by a specified value for every call to the date function in the application code.

10. The computer-implemented method of claim 1, wherein initiating the first server and the second server in the shimming mode includes for each request of the multiple requests received at the first server or the second server: determining, whether a response to the request is stored at the private cache, retrieving the response from the private cache in an event the response is stored in the private cache, retrieving the response from an application service executing at the first server or the second server if the response is not stored in the primary cache and storing the response in the private cache, and returning the response to an entity issuing the corresponding request.

11. The computer-implemented method of claim 10, wherein determining whether the response is stored at the private cache includes: generating a stack trace in response to executing the request, the stack trace including a sequence of values that is generated in response to execution of a customized random function in a server-side portion of application code, determining whether the sequence of values is stored in the private cache, and responsive to a determination that the sequence of values is stored in the private cache, retrieving a value of a key that includes the sequence of values as the response.

12. The computer-implemented method of claim 1, wherein initiating the first server and the second server in the shimming mode includes for each request of the multiple requests received at the first server or the second server: storing a first request of the multiple requests as a key in the private cache and a first response of the multiple responses corresponding to the first request as a value of the key.

13. The computer-implemented method of claim 12, wherein the first request includes a random number as one of multiple parameters of the first request, and wherein when the first request is executed in the replay mode, a random function in application code that is modified to be deterministic generates the same random number causing the first request to continue to map to the key.

14. The computer-implemented method of claim 1, wherein initiating the first server and the second server in the shimming mode includes for each request of the multiple requests received at the first server or the second server: storing a hash value of a first request of the multiple requests as a key in the private cache and a first response of the multiple responses corresponding to the first request as a value of the key.

15. A non-transitory computer-readable storage medium storing computer-readable instructions, comprising:
  instructions for executing a first version of an application of a social networking application at a first server and a second version of the application at a second server in a shimming mode, the executing including, for each request of multiple requests received at the first server or the second server:
    determining, whether a response to the request is stored at a private cache that is shared between the first server and the second server, the response being a webpage of the social networking application or a portion of the webpage, retrieving the response from an application service if the response is not stored in the private cache,
    storing the response in the private cache, and
    returning the response to an entity issuing the corresponding request;
  instructions for storing the multiple requests and the multiple responses in a proxy server;
  instructions for issuing the multiple requests from a client application, wherein the client application receives the multiple responses from the proxy server, the client application rendering a webpage or a portion of the webpage according to the responses; and
  instructions for recording multiple time indicators that indicate a performance of the client application for rendering the webpage or the portion of the webpage.

16. The non-transitory computer-readable storage medium of claim 15, wherein the instructions for recording the multiple time indicators include instructions for measuring the performance of the client application without an effect of a variance of the performance of the first server and the second server on the performance of the client application.

17. The non-transitory computer-readable storage medium of claim 16, wherein the instructions for measuring the performance of the client application include instructions for disabling the first server and the second server from responding to the multiple requests.

18. The non-transitory computer-readable storage medium of claim 15, wherein the instructions for executing the first version and the second version in the shimming mode include instructions for modifying the first version and the second version of the application to make application code to be deterministic.

19. The non-transitory computer-readable storage medium of claim 18, wherein the instructions for modifying the application code include: instructions for replacing a random function in a client-side portion of the application code and a server-side portion of the application code with a random function that is customized based on a seed.

20. A system, comprising:
  a processor;
  a first component configured to execute a first version of an application at a first server;
  a second component configured to execute a second version of the application at a second server;
  a third component configured to issue multiple requests to the first server and the second server;
  a fourth component configured to record multiple responses of the first and second versions of the application corresponding to the multiple requests at a proxy server,
    wherein some of the multiple responses originate from the first version of the application deployed on the first server and some of the multiple responses originate from the second version of the application deployed on the second server,
    wherein the first component and the second component are configured to:
  initiate the first server and the second server in a shimming mode to record the multiple responses and the multiple requests in a private cache that is shared between the first server and the second server, and
    wherein the proxy server is configured to respond to the multiple requests by transmitting the multiple responses to the third component in a replay mode, wherein the replay mode eliminates a variance of the performance of the first server and the second server in measuring the performance of a client application that is processing the multiple responses; and
  a fifth component configured to record, during the replay mode and for each of the multiple responses, multiple time indicators that indicate a performance of the client application for performing multiple functions of the application.

* * * * *